Feb. 7, 1967  F. R. BARNET ETAL  3,303,008
METHOD OF FORMING A GLASS REINFORCED FILAMENT PLASTIC TAPE
Filed Aug. 3, 1962

INVENTORS.
F. ROBERT BARNET
ALBERT LIGHTBODY
ALBERT LEWIS

BY

ATTORNEY.

United States Patent Office 3,303,008
Patented Feb. 7, 1967

3,303,008
METHOD OF FORMING A GLASS REINFORCED
FILAMENT PLASTIC TAPE
Frederick R. Barnet, Kensington, and Albert Lightbody, Silver Spring, Md., and Albert Lewis, Morgantown, W. Va., assignors, by direct and mesne assignments, to the United States of America as represented by the Secretary of the Navy
Filed Aug. 3, 1962, Ser. No. 214,776
3 Claims. (Cl. 65—3)

The present invention relates generally to improvements in glass filament reinforced tape and the method of making the same and more particularly to a new and improved glass filament tape wherein all of the fibers within the tape are arranged in a parallel array with equal tension on each strand and in which the method utilized to produce this tape forms a tape of any desired length and of desired width and thickness in one continuous operation.

In the field of producing reinforced glass filament tape, it has been the general practice to draw a plurality of filaments (a common number of filaments is approximately 204), from a glass furnace and to combine these filaments into a single strand. This strand is then wound up on a spool until it contains several thousand yards of this glass filament strand and then is removed from the glass drawing machine and placed on a second machine which utilizes the strand. The second machine then generally combines a plurality of the strands with a synthetic resin to produce a tape-like end product which can be used in general reinforced plastics applications. A second method in general use is to take this plurality of filaments produced from the glass furnace and to wind them on a large drum and to apply the synthetic resin to the filament somewhere between the glass drawing bushing and the drum, or as the filaments are being wrapped around the drum. In this method the strand begins at one end of the drum and proceeds to the other end encircling the drum in a helical manner and then back again to the first end. This produces a covering on the drum in which the filaments on one layer are at an acute angle to those of the next layer as it returns. After a sufficient number of layers have been applied to the drum to give the desired thickness, one method of making the tape is then to cut suitable strips from the drum in a helical fashion to produce the glass filament reinforced tape. Although such devices have served the purpose, they have not proven entirely satisfactory under all conditions of service for the reason that considerable difficulty has been experienced in the subsequent utilization of this tape so produced. In the production of the tape as described above one-half of the strands have been cut by the cutting process in forming the tape, since the strands of one layer are at a slight angle to those of the next layer. This is an undesirable condition since the tape is weakened in tensile strength and the cut glass filament ends hinder subsequent utilization of the tape in winding such things as rocket motor cases for use on missiles. The cutting process is expensive and time consuming with the subsequent result of higher production cost for the glass tape. Also this presents a limiting factor, i.e. in the length of tape that can be produced, for any given size and on any given piece of equipment.

A further disadvantage of the prior art systems is that there are many steps between the initial production or drawing of the glass from the furnace and the completion of the end product. Glass filaments are very abrasive and with increased handling the abrasion between the filaments themselves causes a subsequent reduction in the overall tensile strength of the strand.

The general purpose of this invention is to provide a tape and a method of making the tape which embraces all of the advantages of similarly employed glass filament reinforced tape producing processes and which possesses none of the disadvantages thereof. This invention utilizes one or more orifice plates with each plate having several hundred to several thousand orifices. Each orifice functions to produce one filament of glass fiber as the molten glass flows therefrom. Immediately following the drawing of the glass from the furnace, a plastic resin and/or resin-chemical glass finish combination is sprayed onto the filaments and strands while these strands are still in the nascent condition and while subsequently winding these strands onto a wind-up wheel while maintaining equal tension on each of the strands by means of a variable speed electric motor. The tape can be varied in width and thickness by varying the number and size of the orifice plates and the number of orifices in each plate on the furnace or furnaces as well as by adjusting the axis of the windup wheel with respect to the orifice plates on the furnace or furnaces to thus produce a tape of any desired width or thickness by the rotation of the windup wheel with respect to the furnace. The tape so produced is of any desired length and all of the filaments within the tape are arranged in a parallel array. A backup tape is fed to the windup wheel to separate the successive layers of the glass filament tape.

An object of this invention is to produce a tape in which all of the filaments are arranged in a parallel array with no fiber crossovers, equal tension on all filaments and with no filaments being cut.

In correlation with the foregoing object, it is a further object of this invention to increase the tensile strength of the plastic tape so produced by reducing the handling required from the filament forming process to the production of the end product.

A still further object is to provide an improved tape with increased tensile strength and improved modulus of elasticity characteristics by fabricating the tape in a manner to eliminate any necessity for cut fiber ends.

Yet another object of the invention is to produce a new and improved tape in a manner facilitating the preselection of any desired combination of width and thickness, length dimensions, and which tape is thereby particularly well adapted for the production of a specific end product calling for or requiring such a unique dimensional specification for the most advantageous fabrication thereof.

A still further object of the invention is to provide an improved fabricating technique for glass fiber constituted tape which functions to reduce or eliminate abrasive friction normally occurring between the filaments and strands by applying a plastic resin and/or resin-chemical finish combination to the strands immediately after drawing the glass filaments from the furnace and while the strands are still in their nascent state.

Another object of the invention is to protect the glass surface of glass filaments of filamentary formed tape from at least the ambient deleterious affect chemical elements or compounds existent in the surrounding atmosphere by applying a resin and/or resin-chemical finish combination thereto during manufacture thereof and particularly at the time the filaments are drawn from the glass furnace used for manufacture thereof.

Another object of the invention is to control the width and thickness of a filamentary constituted glass fiber type tape by varying the position of the axis of the tape wheel used for take up thereof during tape manufacture with a more accurately correlated positional relationship thereof with respect to the orifice plates or plate on the glass drawing furnace or furnaces used for fiber manufacture.

Another object of the present invention is to provide a tape of improved physical, structural, fabricational dimensional and functional characteristics that is particularly well adapted for utilization in reinforced plastics fabrication application and which uniquely permits the obtention of results in the utilization thereof of a character superior to prior art techniques requiring use of maximum quality control and optimum fabrication controls, wherein the improvements thereof are accomplished to a material extent by techniques for obviating cut and frayed filaments from the edge of the tape.

Other objects and features of the invention will become apparent to those skilled in the art as the disclosure is made in the following detailed description of a preferred embodiment of the invention as illustrated in the drawing in which.

Figure 1:
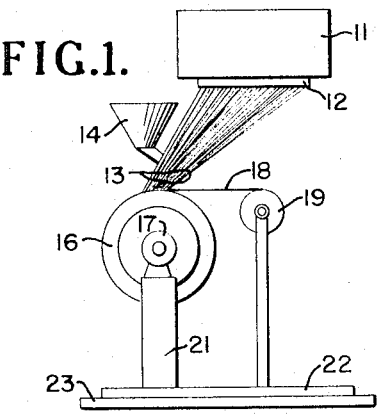
FIG. 1 is a diagrammatic front elevation view of the preferred embodiment of the tape fabrication apparatus of the instant invention.
Figure 2:
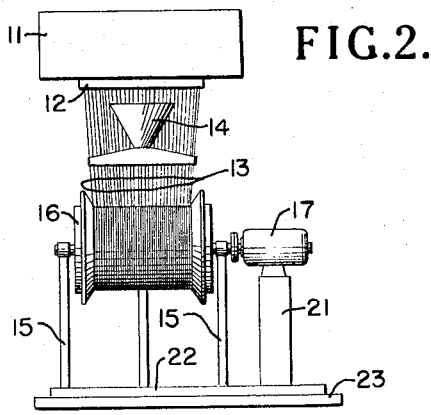
FIG. 2 is a diagrammatic side elevation view of the apparatus of FIG. 1.
Figure 3:
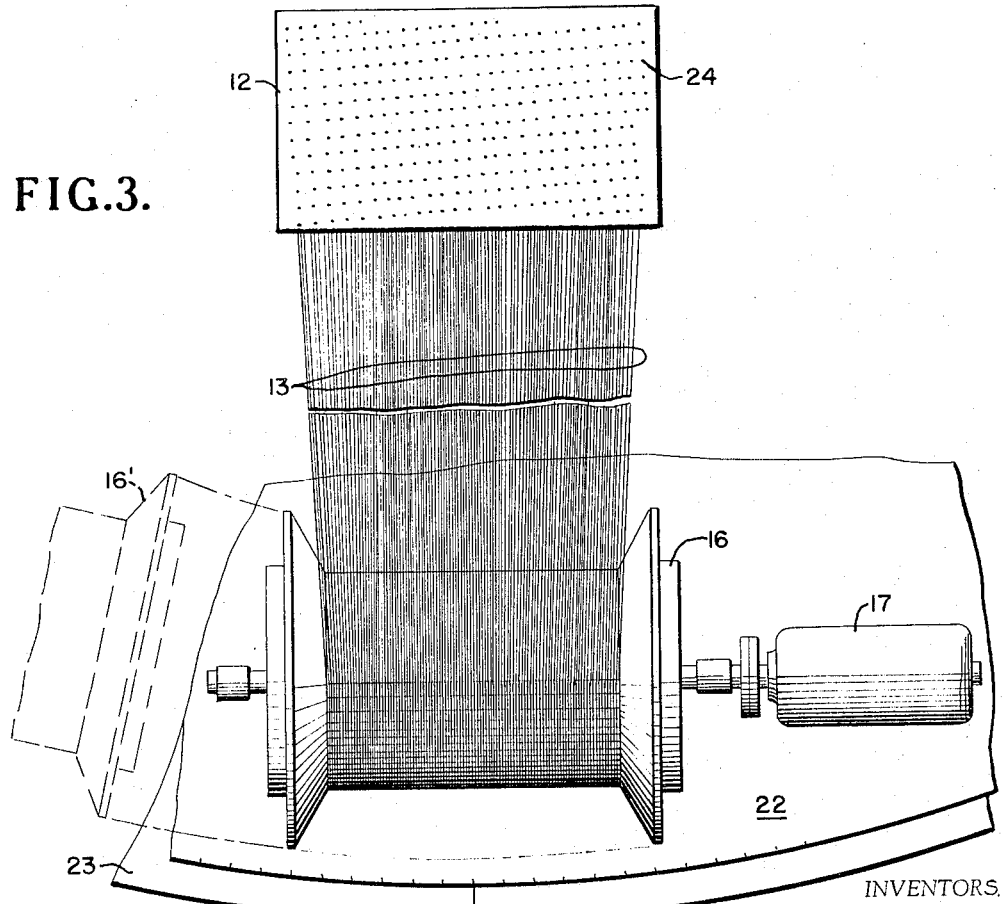
FIG. 3 is an enlarged plan view of the orifice plate and the windup wheel mechanism of the apparatus of FIGS. 1 and 2, further illustrating by dashed outline, the positional displacement of the windup wheel for effecting control over a bundle of glass fibers to establish and maintain or alter to any desired extent the width and thickness dimensions of the tape.

Referring now to the drawing, wherein like reference characters designate like or corresponding parts throughout the several views, there is illustrated in FIG. 1 a glass furnace 11 with an orifice plate 12 attached thereto containing a plurality of orifices in an elongated array. As shown for illustrative purposes in FIG. 3, the array is generally rectangular. This orifice plate controls formation of filaments in the initial positional displacement of all of individual ones thereof as the molten glass flows from the furnace through the orifices in the plate and further under the influence of the windup wheel whereby the glass is rapidly drawn from the orifices. These filaments have approximate diameters of from 0.0005 to 0.00005 inch depending upon the conditions under which they are drawn. A multiplicity of filaments are gathered together to form the final glass filament tape. All the individual filaments are not shown in FIG. 1, however, they are indicated in gross fashion as elements 13. The filaments are gathered and contemporaneously reel or spool in mass and in ribbon or tape-like form on a glass tape windup wheel 16. Substantially immediately in time after the glass fibers have been formed upon effluxing as from the orifice plate 12 disposed at the glass furnace 11, a plastic resin for example an epoxy resin, and/or chemical finish is sprayed on by resin applicator 14 or otherwise applied in a manner whereby the individual filaments and strands are covered and saturated with this material while the glass filaments are still in a nascent condition or very shortly thereafter. The application of this resinous material at this time serves the purpose of both binding together the filaments as well as acting as lubricants between the various filaments and strands of glass filaments thereby reducing any inherent abrasive tendency on the part of the coadjacent strands to cut each other. This material also serves to give environmental protection to the newly formed glass. Electric motor 17, which is of the variable speed torque motor type, drives the windup wheel 16 and maintains a constant tension on elements 13 as well as pulling a suitable backup tape 18 of a material to which the bonding substance does not adhere, such as vinyl plastic, silicon treated ripple paper or other suitable material capable of performing properly at the high peripheral speeds of the glass tape windup wheel from the backup tape roll 19 thereby forming a distinct layer of parallel filaments separated from each successive layer by the backup tape 18. The plastic resin which has been applied to the glass filament 13 is not completely cured at this time but is kept in the uncured state so that the tape may be wound on mandrels to form rocket motor housings or other suitable shapes which are the final end products. After it has been formed into the proper shape it is cured by appropriate techniques known in the art. Supporting the electric motor 17 and the windup wheel 16 is the motor frame 21, which maintains a fixed relationship between the axis of the pillow block type bearings or journal supports as shown at 15, for rotation of the windup wheel from the shaft of the motor 17. The entire support is a fixed unit which is attached to the base 22 in a manner normally maintaining a fixed positional relationship therebetween. The base 22 however is pivotally mounted on the table or frame 23 about an axis coincident with the geometrical center of the orifice plate 12 so that by pivoting the base 22 through an angle to an alternate position along the path indicated for the projection of the spool 16′ as shown in FIG. 3, it carries the entire windup wheel mechanism therewith. It is thus possible to vary the width and thickness of the tape produced, by arcuately changing and thereafter maintaining fixed the new position of the support structure 21 while permitting takeup rotation of the wheel 16 about the shaft axis of the glass tape windup wheel 16. Changes of position are effected prior to operation of the apparatus or during a shutdown period.

Although the windup wheel 16, as illustrated in this view, forms a single tape which nearly fills the windup wheel, it is possible and is a matter of choice to place a different windup wheel on the frame 21 and to have the entire frame reciprocate back and forth for setup purposes only, and during shut down periods between cycles of operation by means of a hydraulic pump carriage. Such a hydraulically controlled carriage is old and well known, one example being shown in U.S. Patent 2,656,873 issued to J. F. Stephens, on October 27, 1953.

FIG. 3 shows an orifice plate 12 with a plurality of orifices 24 arranged in a pattern thereon. The orifice plate 12 as illustrated has been greatly enlarged to clearly show a separation of the orifices 24, however, in actual use the width of the windup wheel 16 is approximately equal to the diagonal dimension of orifice plate 12 unless a reciprocating carriage is utilized. By the proper combination of furnace or furnaces 11 with suitable orifice plates or plates 12 attached thereto and windup wheel 16 it is possible to obtain a glass filament tape of the same thickness but of greater width. With a given set of orifice plates 12 and windup wheel 16 the width and thickness of the glass filament tape produced can be varied by changing the angular relationship between the axis of the windup wheel and the orifice plate as by rotating the base 22 on the frame 23 to a position such as is shown by the dashed lines of FIG. 3. As an example, the width of the tape would be the smaller dimension of the rectangular orifice plate 12 if the base 22 were rotated 90° in a clock-wise direction from that shown in FIG. 3. The width and thickness of the tape drawn from the orifice plate 12 upon the windup wheel 16 is limited only by the capacity of the furnace 11, FIG. 1, and by the number and configurations of the orifice plates 12 attached thereto. It is to be understood that windup wheel 16 is maintained stationary with respect to orifice plate 12 during any single tape forming operation. Thus, each individual length of tape as spooled on the take up wheel 16 has no cross overs.

The tape produced by this invention is drawn directly from the furnace to the windup wheel with the glass filaments drawn from the furnace not physically touching any other object and thus the filaments so drawn and formed are not subject to damage by abrasion or deformation while still in a physically nascent state or shortly thereafter. Tape produced by apparatus of the character disclosed and operated in accordance with the instant inventive concept may be varied in size from a tape of 10 mils by 10 mils up to a tape 18 inches wide.

Obviously many modifications and variations of the present invention are possible in light of the above teachings. It is therefore understood, that with the scope of the appended claims, the invention may be practiced otherwise than as specifically described.

What is claimed is:

1. The process of forming a glass reinforced filament plastic tape including the steps of drawing from at least one orifice plate having an elongated array of orifices therein, a plurality of molten glass filaments from at least one glass producing furnace, spraying a resin bonding substance to said filaments while the filaments are in a nearly nascent state, winding the filaments on a windup wheel to form adjacent layers of glass filament reinforced tape, and rotating the axis of the windup wheel in a plane parallel to the general plane of said orifice plate and about an axis perpendicular to said plane and passing through the geometrical center thereof to produce variations of width and thickness of the tape produced.

2. The processes recited in claim 1 including the further step of separating layers of glass filament tape by inserting a back up tape of a material and construction of a character providing immunity to mutual adhesion between the filament tape, and having the same width as the glass filament tape between the adjacent layers of the glass filament tape as the glass filament tape is wound on said windup wheel.

3. The process of forming a glass filament reinforced plastic tape of a predetermined width and thickness including the steps of drawing a plurality of glass filaments from an elongated orifice plate on a glass furnace, spraying a bonding substance to the filaments, collecting the filaments on a windup wheel, and selectively varying the orientation of the orifice plate in correlation with the changing of the orientation of the rotational axis of the windup wheel to control the width and thickness of the tape wound on said windup wheel.

References Cited by the Examiner

UNITED STATES PATENTS

| 2,913,037 | 11/1959 | Modigliani | 156—167 |
| 2,951,003 | 8/1960 | Stephens | 161—143 |

FOREIGN PATENTS

| 680,203 | 10/1952 | Great Britain. |

EARL M. BERGERT, *Primary Examiner.*

R. J. CARLSON, P. DIER, *Assistant Examiners.*